US010395068B2

(12) United States Patent
Belk et al.

(10) Patent No.: US 10,395,068 B2
(45) Date of Patent: Aug. 27, 2019

(54) USER ACCOUNT FOR SYSTEM PROTECTION OR RECOVERY

(71) Applicant: Apple Inc., Cupertino, CA (US)

(72) Inventors: Andrew T. Belk, Menlo Park, CA (US); Steve S. Ko, San Francisco, CA (US); Jack R. Matthew, San Francisco, CA (US); William E. Stevenson, Scotts Valley, CA (US); Craig M. Federighi, Los Altos Hills, CA (US); Patrick L. Coffman, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/231,704

(22) Filed: Aug. 8, 2016

(65) Prior Publication Data
US 2017/0039398 A1    Feb. 9, 2017

Related U.S. Application Data

(63) Continuation of application No. 13/090,867, filed on Apr. 20, 2011, now abandoned.

(60) Provisional application No. 61/433,113, filed on Jan. 14, 2011.

(51) Int. Cl.
H04L 29/06    (2006.01)
G06F 21/88    (2013.01)
H04W 12/12   (2009.01)
G06F 11/14    (2006.01)
(Continued)

(52) U.S. Cl.
CPC .......... G06F 21/88 (2013.01); G06F 11/1469 (2013.01); G06F 21/6218 (2013.01); H04W 12/12 (2013.01); G06F 2221/2111 (2013.01); G06F 2221/2143 (2013.01); H04W 4/02 (2013.01)

(58) Field of Classification Search
CPC ................. H04L 63/083; H04L 63/08; G06F 2221/2111; G06F 2221/2143
See application file for complete search history.

(56) References Cited

U.S. PATENT DOCUMENTS 6,804,699 B1 * 10/2004 Henrie .................. G06F 21/31
                                                        709/203
7,788,701 B1    8/2010 Lavin
(Continued)

OTHER PUBLICATIONS

Guest Account—Turn on or Off—Windows 7 Help Forums, Apr. 19, 2009, Brink, pp. 1-7.*
(Continued)

Primary Examiner — Kari L Schmidt
Assistant Examiner — Fahimeh Mohammadi
(74) Attorney, Agent, or Firm — Dickinson Wright RLLP

(57) ABSTRACT

In one embodiment, a data processing system includes a guest account that is configured to assist in the protection and recovery of the data processing system when it is lost or stolen. In one embodiment, the guest account can allow Internet access and can include a web browser to allow the guest, who might be a thief, to use the system to browse the Internet. While such use occurs, the system can perform actions specified by an authorized user of the system, and such actions can include determining a location of the system and transmitting the location to the authorized user, erasing data on the system, displaying a message, capturing an image, etc.

20 Claims, 10 Drawing Sheets

(51) Int. Cl.
*G06F 21/62* (2013.01)
*H04W 4/02* (2018.01)

(56) References Cited

U.S. PATENT DOCUMENTS

| | | | | |
|---|---|---|---|---|
| 7,874,006 B2* | 1/2011 | Hassan | ................ | H04L 63/104 |
| | | | | 713/164 |
| 8,239,608 B1 | 8/2012 | Ginzton | | |
| 8,285,978 B2 | 10/2012 | Kim | | |
| 8,566,961 B2 | 10/2013 | Lemieux et al. | | |
| 2003/0005092 A1 | 1/2003 | Nelson et al. | | |
| 2003/0037279 A1 | 2/2003 | Laio | | |
| 2003/0117316 A1 | 6/2003 | Tischer | | |
| 2003/0140103 A1* | 7/2003 | Szeto | ..................... | H04L 51/04 |
| | | | | 709/206 |
| 2005/0044404 A1 | 2/2005 | Bhansali et al. | | |
| 2008/0133726 A1* | 6/2008 | Richardson | ........... | H04L 63/105 |
| | | | | 709/223 |
| 2008/0144825 A1* | 6/2008 | Dias | ........................ | G06F 21/57 |
| | | | | 380/259 |
| 2009/0222878 A1* | 9/2009 | Walsh | ................. | G06F 21/6218 |
| | | | | 726/1 |
| 2010/0083368 A1* | 4/2010 | Kristensen | .............. | G06F 21/34 |
| | | | | 726/18 |
| 2010/0134299 A1* | 6/2010 | Fitzgerald | ............... | G06F 21/88 |
| | | | | 340/573.1 |
| 2010/0165133 A1 | 7/2010 | Shen | | |
| 2010/0207721 A1 | 8/2010 | Nakajima et al. | | |
| 2010/0210240 A1* | 8/2010 | Mahaffey | ............ | H04L 41/0253 |
| | | | | 455/411 |
| 2010/0229220 A1 | 9/2010 | Tsai | | |
| 2011/0016303 A1* | 1/2011 | Kumagai | ................ | G06F 9/441 |
| | | | | 713/2 |
| 2011/0047609 A1 | 2/2011 | Tetsuhashi | | |
| 2012/0075099 A1* | 3/2012 | Brown | .................. | H04W 4/029 |
| | | | | 340/540 |
| 2012/0079607 A1* | 3/2012 | Lal | .......................... | G06F 21/10 |
| | | | | 726/29 |
| 2012/0151115 A1 | 6/2012 | Wolf | | |
| 2012/0185799 A1* | 7/2012 | Tsai | ....................... | G06F 9/451 |
| | | | | 715/804 |
| 2012/0185933 A1 | 7/2012 | Belk et al. | | |

OTHER PUBLICATIONS

Guest Account—Turn on or Off—Windows 7 Help Forum, Apr. 19, 2009, Brink, pp. 1-7.*
Windows 7: Guest Account—Turn on or Off, Apr. 19, 2009, Brink, pp. 1-7.*
Marguerite Reardon, Mobile Phones that track your buddies, Dec. 19, 2006, CNET, pp. 1-4.*
Thomas Ristenpart et al., Privacy-Preserving Location Tracking of Lost or Stolen Devices, Jul. 28-Aug. 1, 2008, ACM, pp. 275-290.*
Intel Anti-Theft Service, 2011, Sony.com, pp. 1-36.*
Brink, Windows 7: Guest Account—Turn on or Off, Apr. 2009, Windows Seven Forums, 1-5 pages, Apr. 19, 2009.

* cited by examiner

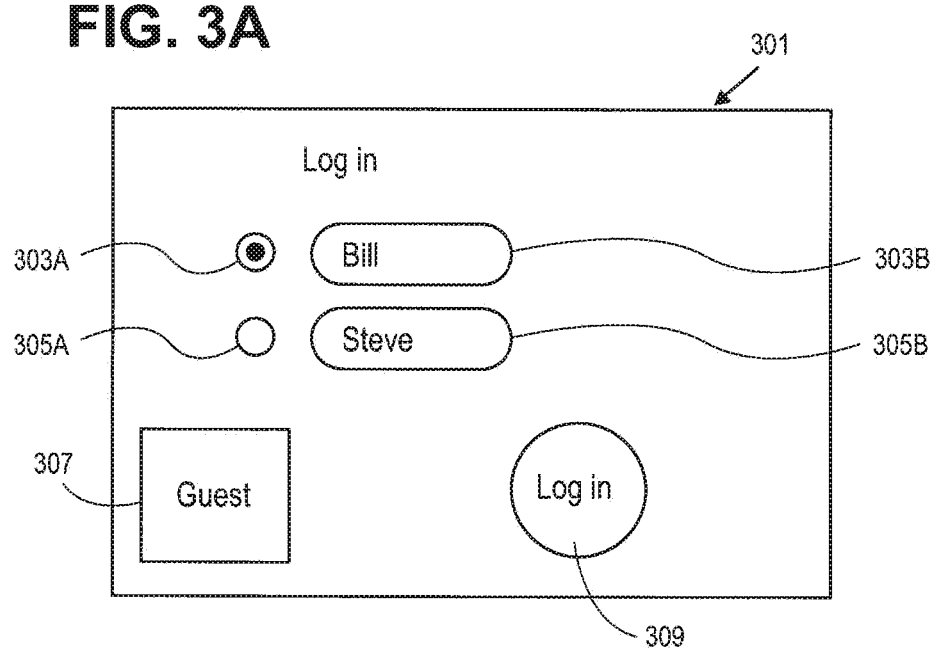
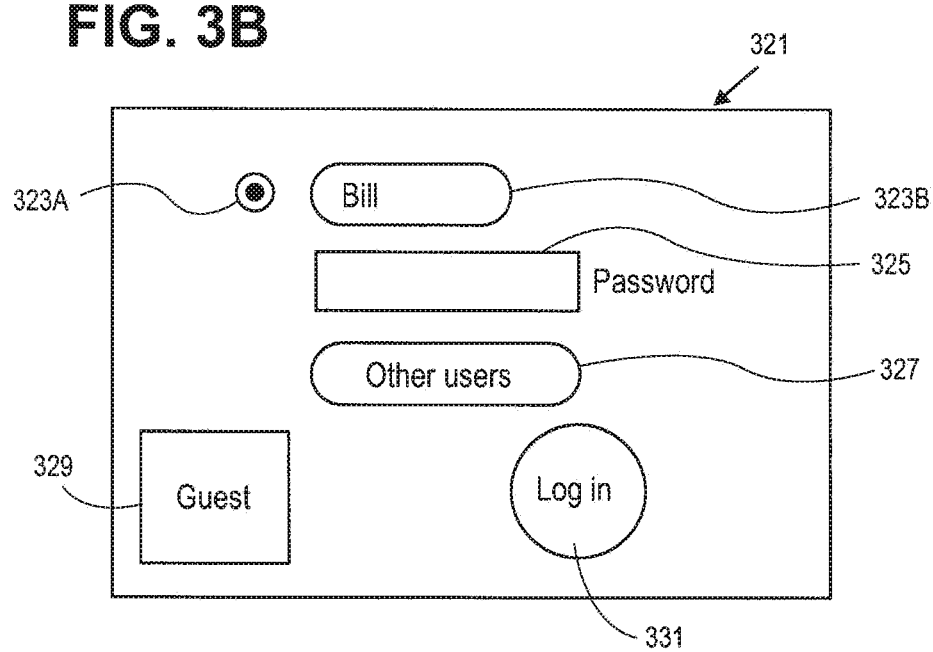

USER ACCOUNT FOR SYSTEM PROTECTION OR RECOVERY

CROSS-REFERENCE TO RELATED APPLICATIONS

This application is a continuation of, and claims priority to, U.S. patent application Ser. No. 13/090,867 filed Apr. 20, 2011, entitled "USER ACCOUNT FOR SYSTEM PROTECTION OR RECOVERY" which claims the benefit of the filing date, under 35 U.S.C. § 119(e), of U.S. Provisional Application No. 61/433,113 filed on Jan. 14, 2011, which are incorporated herein by reference in their entirety for all purposes.

BACKGROUND OF THE INVENTION

The present disclosure relates to methods and apparatuses for protecting or recovering data processing systems, such as a laptop or a cellular telephone that has been lost or stolen Existing methods for protecting data processing systems include encryption of storage devices or encryption of information stored on storage devices. For example, information on a hard drive or flash memory can be encrypted in order to protect the content from discovery by those not intended to see the content. The encryption can be of a portion of the data on a storage device or the entire storage device to the extent that is possible. Another technique which is known in the art for protecting a system is the use of a remotely controlled erase mechanism which can erase data on a stolen or lost system in response to a command sent to the system through a network, such as the Internet or a cellular telephone network. A software product known as "Undercover," which is available at orbicule.com, can be used to take pictures of a user of a lost or stolen system.

SUMMARY OF THE DESCRIPTION

The present invention provides various embodiments for protecting lost or stolen systems. For example, in one embodiment, a method for protecting a lost or stolen system can include receiving an input to start up or wake up a data processing system and receiving an input to use a guest account log in option which is presented in response to the input to start up or wake up the system. The method can further include presenting a user interface of a guest account on the data processing system and receiving at least one signal from another data processing system which causes an action to be performed while the guest account is used. This action can be specified by an authorized user of the data processing system, such as the owner of the system which has been lost or stolen from the owner of the data processing system. The action can include at least one of: (a) determining information which indicates a location of the data processing system and transmitting the location information to the authorized user; or (b) erasing data on the data storage device of the data processing system; or (c) displaying a message which requests that the data processing system be returned to the authorized user; or (d) capturing an image of the user of the data processing system; or (e) locking the user (e.g. the thief) from logging into a guest account of the authorized user; or (f) any combination of two or more of these actions.

The location or information which indicates a location can be derived from a network connection (e.g. a WiFi hotspot database) or a satellite positioning system (e.g. a GPS receiver) or a cellular wireless radio connection, etc. In one embodiment, the method can be performed in a system which includes two partitions on a storage device, such as a magnetic hard drive or a flash memory or other storage devices. One partition can include an operating system for the authorized user's account, and a second partition, from which a guest account is executed, includes a second operating system stored on the second partition of the device. In one embodiment, the second partition can include recovery software which is configured to perform at least one of repairing the first partition of the storage device or reinstalling the first operating system on the first partition or restoring data files of the authorized user on the first partition, wherein the restoration can be performed from a backup of the data files.

A method according to another embodiment of the present invention can include receiving an input to start up or wake up a data processing system and receiving an input to use a guest account log in option which is presented in response to the input to start up or wake up the system, and presenting a user interface of the guest account on the data processing system and performing an action at the data processing system, wherein the action is specified by an authorized user and is enabled by the use of the guest account which automatically provides a network access through at least one network connection. In one embodiment, in this method, the network access includes Internet access and the network access cannot be disabled when using the guest account. The actions which are specified by the authorized user can be any one of the actions described herein and, in one embodiment, these actions can be taken or performed automatically in response to the use of the guest account without having to receive a signal from another data processing system. This embodiment can automatically provide a network functionality to allow actions to be performed, although such network functionality is not required in at least certain embodiments.

A method according to another embodiment can cause the system to switch, in response to a notification or other signal, into a restricted guest account during the use of a lost or stolen system. In one embodiment, this method can include receiving and responding to user inputs as if the data processing system is being used by an authorized user, and then receiving, through a network connection, a notification that represents or results from an indication that the use of the system is not authorized. In response to this notification, the system can switch into a restricted guest account. In one embodiment, this can include a forced save of user data and system state to a non-volatile storage (e.g. a magnetic hard drive or a flash memory) and then forcing a rebooting into a restricted guest account. While in the guest account, the system can perform at least one action specified by an authorized user, such as any one of the actions described herein (e.g. determining a location of the system, erasing data on the system, displaying a message which requests the system to be returned, capturing an image of the user, locking the user from logging into a user account of the authorized user, etc.). The switching, which occurs in response to the notification, can include a rebooting of the data processing system into the restricted guest account, and the restricted guest account can allow use of a web browser and provide access to the Internet. In one embodiment, the restricted guest account may appear as a normal user account, such as a user account provided for an authorized user of the system. For example, all of the applications on the system may be available for use, including web browsers, PDF viewers, word processing software, number processing software, photo processing software, etc. This can tend to encourage the person who has obtained the lost or stolen system to use the system, which can then permit the system to be discovered or otherwise to perform the actions specified by the authorized user while the guest account is being used.

A method according to another embodiment of the present invention can cause the system to operate in one way if data on the system is not encrypted and to operate another way if data on the system is encrypted. If data is encrypted in the system, then the system can be operated in a manner to provide a higher level of protection than other methods described herein. For example, a method according to this embodiment can boot into a restricted guest account in response to determining that the data processing system has an encrypted storage device and in response to a user's selection of a guest account. The restricted guest account can provide a web browser and Internet access and network access can be enabled automatically to allow use of the web browser and Internet access. In one implementation of this embodiment, the network access cannot be disabled by the user of the guest account. The method can further include receiving at least one signal from another data processing system, which signal causes an action to be performed while the guest account is used. This action can be used to protect data on the data processing system or to recover the data processing system and can be specified by an authorized user of the data processing system which may be lost or stolen. The method can also include locking out the user of the guest account from an authorized user's account unless the authorized user's account is enabled with the entry of a security code which may be different than a log in code or password.

Other methods and other embodiments are described herein, including computer readable or machine readable tangible storage medium which can provide non-transitory storage of computer programs, which when executed can perform any one of the methods described herein, and the present invention also includes data processing systems, including one or more systems which can perform any one of the methods described herein.

The above summary does not include an exhaustive list of all aspects of the present invention. It is contemplated that the invention includes all systems and methods that can be practiced from all suitable combinations of the various aspects summarized above, and also those disclosed in the Detailed Description below.

BRIEF DESCRIPTION OF THE DRAWINGS

The present invention is illustrated by way of example and not limitation in the figures of the accompanying drawings in which like references indicate similar elements.

FIG. 3A shows an example of a user interface for a log in window according to one embodiment of the present invention.

FIG. 3B shows an example of a user interface, such as a window, for a log in after a wake up from a sleep state, for example.

DETAILED DESCRIPTION

Figure 1:
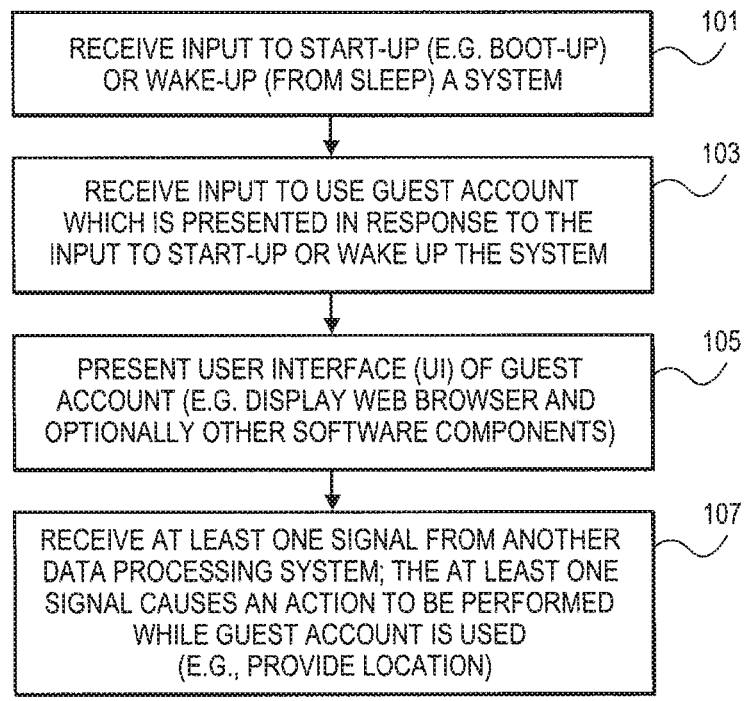
FIG. 1 shows a flowchart which depicts a method according to one embodiment of the present invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

In one embodiment, a data processing system can include a guest account that is configured to assist in the protection or recovery or both the protection and recovery of the data processing system when, for example, it is stolen or lost. In one embodiment, the guest account can allow Internet access and can include a web browser to allow the guest, who might be a thief, to use the system to browse the Internet. Furthermore, the guest account can be configured so that the user of the guest account cannot disable network access or Internet access. While such use by the guest account occurs, the system can perform actions specified by an authorized user of the system, and such actions can include determining a location of the system and transmitting the location to the authorized user, or erasing data on the system, or displaying a message to the user of the guest account, or capturing an image of the user of the guest account, etc. The guest account can normally be entered into after startup of the data processing system (e.g. booting the data processing system) or upon waking up the system from a sleep or other low power state. During use of the guest account, the data processing system which provides the guest account can be in communication with one or more other systems, such as a server system that can provide a notification, such as a push notification, to a system that has been lost or stolen and this push notification can be generated in response to the use of another data processing system, used by the authorized user, who has requested the server to transmit the push notification to the system of the authorized user which has been lost or stolen. In response to the notification from the server, the data processing system can, in one embodiment, lock the authorized user's user accounts such that a new password may be required to access those authorized user accounts, etc. Further details are provided below in conjunction with the accompanying figures.

Figure 2:
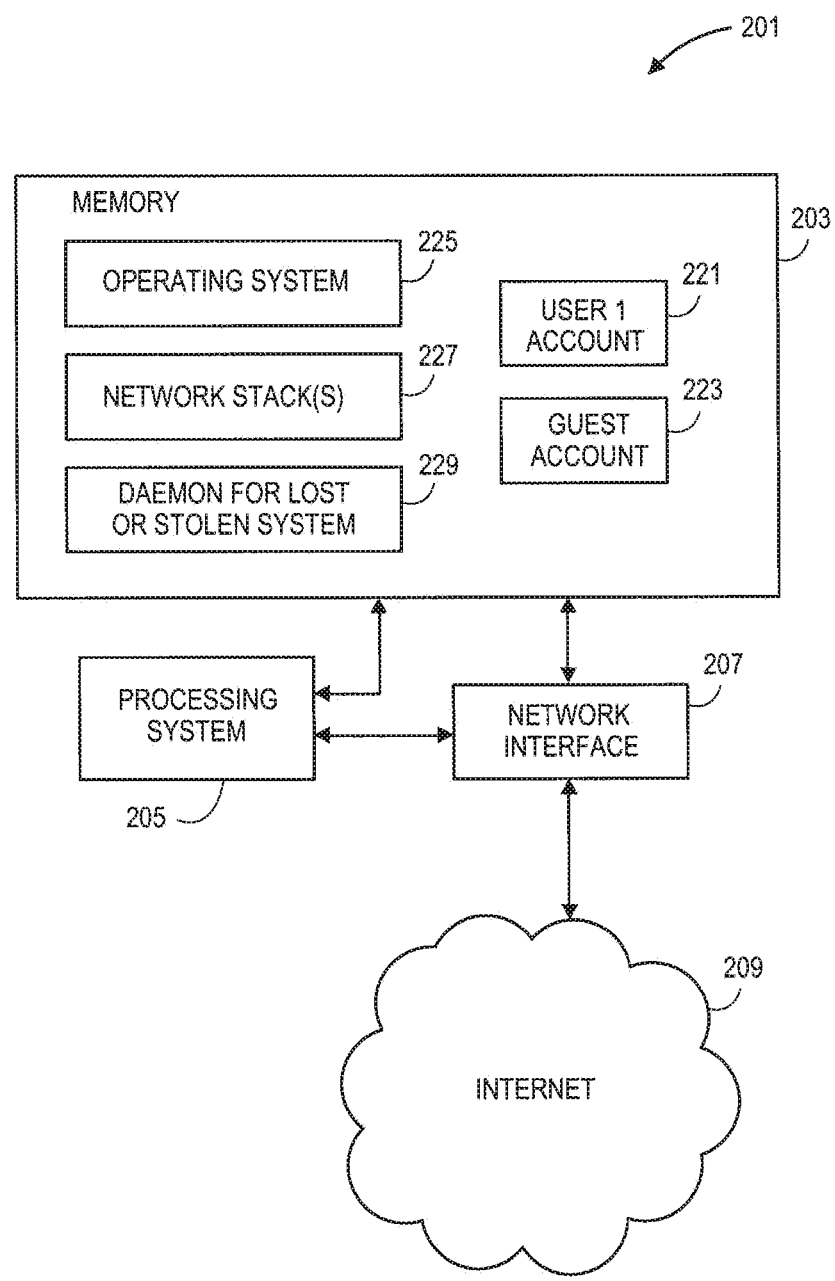
FIG. 2 shows an example of a data processing system which can be used with one or more of the embodiments of the present invention.

The method shown in FIG. 1 can be employed to protect a data processing system by enabling a guest account to perform options or actions which are enabled by the use of the guest account. FIG. 2 shows an example of such a data processing system which includes a guest account 223 as well as an authorized user's account 203. Information with respect to these two accounts can be stored in memory 201 which can be one or more of a magnetic hard drive, flash memory, a semiconductor memory such as DRAM, etc. This memory can be coupled to a processing system 205 which can include one or more processors in a data processing system such as a computer, a smart phone, or an entertainment system, or other consumer electronic device. The data processing system can also include a network interface 207 which is coupled to the processing system 205 and to the memory 201 to allow the data processing system to communicate with a network, such as the Internet 209. Memory 201 can also include an operating system 225, such as the Macintosh operating system OS X from Apple Inc. or the Windows operating system from Microsoft. Memory 201 can also include a network stack or a plurality of network stacks 227 to allow the system to communicate through the Internet or other network. Memory 201 can also include a daemon for the lost or stolen system which can operate in the background as a daemon process to monitor notifications from another data processing system such as a server system 403 shown in FIG. 4 or another data processing system 405 which can be operated by an authorized user seeking to recover or protect the lost or stolen system of the authorized user.

The system shown in FIG. 2 can respond to an input received in operation 101 of FIG. 1 to either start up the system or to wake up the system from sleep. In response to this input, the system can present a user interface which allows a user to log in as a guest on the guest account 223. This input, received in operation 103 shown in FIG. 1, can occur through a variety of different user interfaces, including the user interfaces shown in FIGS. 3A and 3B. The user interface shown in FIG. 3A may be a window 301 shown in a desktop or other background on a display of a data processing system, such as the system shown in FIG. 2. Window 301 can include log in button 309 and can include a list of authorized users, such as authorized users 303B and 305B, each associated with a radio button, such as radio button 303A and radio button 305A, allowing the user to select between different user accounts and then to select the log in button 309 to cause the system to log that user in. If a password is required, a data entry field for the password can be presented within window 301 or a follow-on window which appears after selecting the log in button 309. A guest account button 307 is also shown within window 301 and allows a user who does not want to or cannot log in as an authorized user to log in as a guest user by selecting the guest account button 307. Window 301 may appear in response to booting up the system or may appear in response to waking up the system from a sleep state.

FIG. 3B shows an alternative user interface to present a log in window 321; the example shown in FIG. 3B may occur if the user has instituted a screen lock in which the system goes to sleep and the display turns off after a period of time, and the user can awake the system from this sleep state and in response to such awakening, the system presents window 321. In this case, the system went asleep with the authorized user Bill having been using the system and so the log in window shows Bill as the last authorized user and allows Bill to enter Bill's password into data entry field 325 and then Bill can log in by selecting the log in button 331. If other authorized users want to log into their accounts, they need to select button 327 which can present a list of other authorized users and any one of those authorized users can be selected and a password entered for that authorized user and then the log in button 331 can be selected to log in as that authorized user. Window 321 also includes a guest account button 329 which can be used to access the guest account, such as any one of the guest accounts described herein.

Returning to FIG. 1, it can be seen that in response to receiving an input to using the guest account in operation 103, the system can present, in operation 105, the user interface for the guest account. This can include the display of a normal or apparently normal desktop for the guest account and one or more applications available to the user of the guest account. In a typical implementation, this can include a web browser application, a PDF viewer, a text editing application, a photo editing application, an email application, and other applications commonly provided for a guest account. In addition, the system can be enabled to provide network access, such as network access through a wireless medium or wired medium (e.g. Ethernet wired access or WiFi wireless access or cellular telephone access, etc.). In one embodiment, the user of the guest account cannot disable network access and Internet access and hence the system has the capability of communicating with other systems, such as server system 403 or the data processing system 405 which can be operated by the authorized user to transmit a signal either directly to the lost or stolen system or to the lost or stolen system through the server 403 as described further below. In effect, the use of the guest account enables and facilitates the protection and/or recovery of the system because the guest account provides network access which allows the server or the authorized user or both to communicate with the system that is lost or stolen. In operation 107, the system which is lost or stolen can receive at least one signal from another data processing system, such as a server system 403 or another data processing system, such as system 405, which can be operated by an authorized user. In one embodiment, this at least one signal can cause the system which is lost or stolen to take an action or to perform an action while the guest account is being used. This action can be any of a plurality of possible actions, including, for example, determining information which indicates a location of the data processing system and transmitting that information to the authorized user; or erasing data on a data storage device of the data processing system which was lost or stolen; or displaying a message on a display device of the system which is lost or stolen, which message requests that the system be returned to the authorized user, or capturing an image of the user of the system which is lost or stolen; or locking the user of the guest account from logging into a user account of an authorized user of the system which is lost or stolen; or any combination of two or more of these actions, etc.

When the at least one action includes determining information which indicates the location of the system, the system can determine the information from one of a network connection, such as a wired Internet connection or a wireless connection, such as a WiFi hotspot which can be identified by name or other identifier and then associated through a database with a location for that WiFi hotspot or other WiFi location; alternatively, the information about location can be provided by a satellite positioning system such as a GPS (global positioning system) receiver, or can be provided by information about location derived from a wireless cellular telephone radio connection. This location information can be transmitted to the authorized user through a server system, such as server system 403, or directly to the authorized user who is using another data processing system, such as the data processing system 405 which can be used by an authorized user. When the action which is performed includes capturing an image of the user of the guest account, the system which captures the image can do so through a camera coupled to the system which is lost or stolen and transmit that image to the authorized user either directly to the authorized user or through another data processing system, such as the server 403 as shown in FIG. 4.

Figure 6:
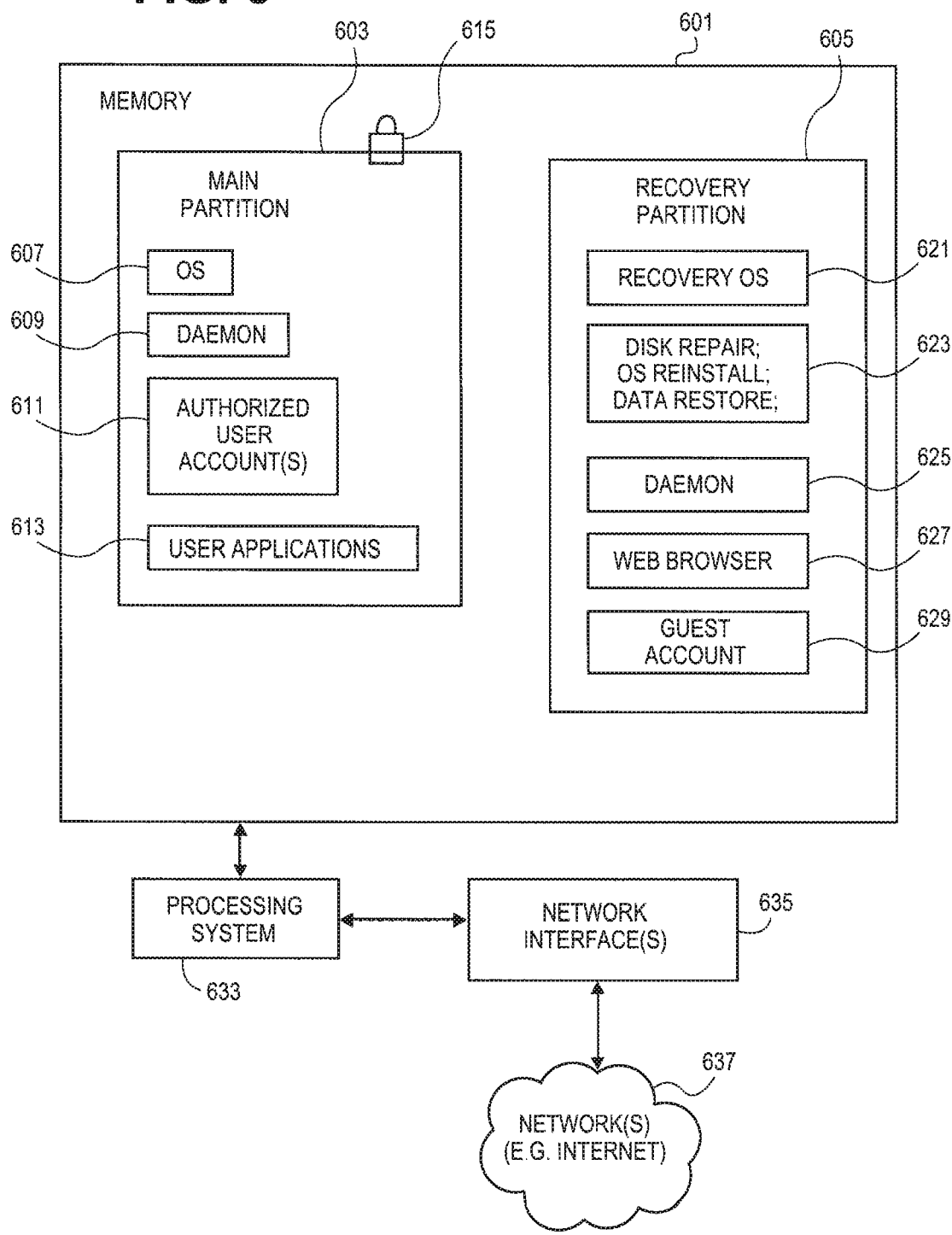
FIG. 6 depicts software components and data stored on a storage device, such as a magnetic hard drive or a flash memory or other form of storage devices.

In one embodiment of the method shown in FIG. 1, and implemented as shown by the system of FIG. 2, the user account which is authorized can be executed through a first operating system which is stored on a first partition of a data storage device, and the guest account is executed through a second operating system stored on a second partition of the data storage device. In this implementation, the data files of the authorized user are not accessible to the user of the guest account, and this provides an added form of protection for data of the authorized user's accounts. In one embodiment, the second partition can include recovery software which is configured to perform at least one of repairing the first partition of the data storage device or reinstalling the first operating system on the first partition, or restoring data files of the authorized user on the first partition, through backups of the data files previously obtained for the authorized user. FIG. 6 shows an example of a data storage device, such as a magnetic hard drive or flash memory or other types of non-volatile storage devices which can include multiple partitions. A further description of FIG. 6 will be provided in conjunction with the method shown in FIG. 8, and it will be appreciated that the multiple partition approach may be employed with any one of the embodiments described herein.

If the lost or stolen system is recovered by the authorized user, the system can implement a technique to allow the one or more authorized users to exit the guest account mode, particularly if the system is locked in the guest account mode and will not permit entry into an authorized user's account. In one embodiment, the guest account may be exited by requesting the system to log into an authorized user's account and entering the standard password for that account. In other embodiments, the password required to exit the guest account may be a newly established password established by the authorized user when the authorized user reported that the system was lost or stolen. In this case, the user may need to enter a different password, which is different than the password used to log in for that authorized user, when exiting the guest account. A further discussion of the process of exiting the guest account will be provided below in conjunction with FIG. 9.

Figure 4:
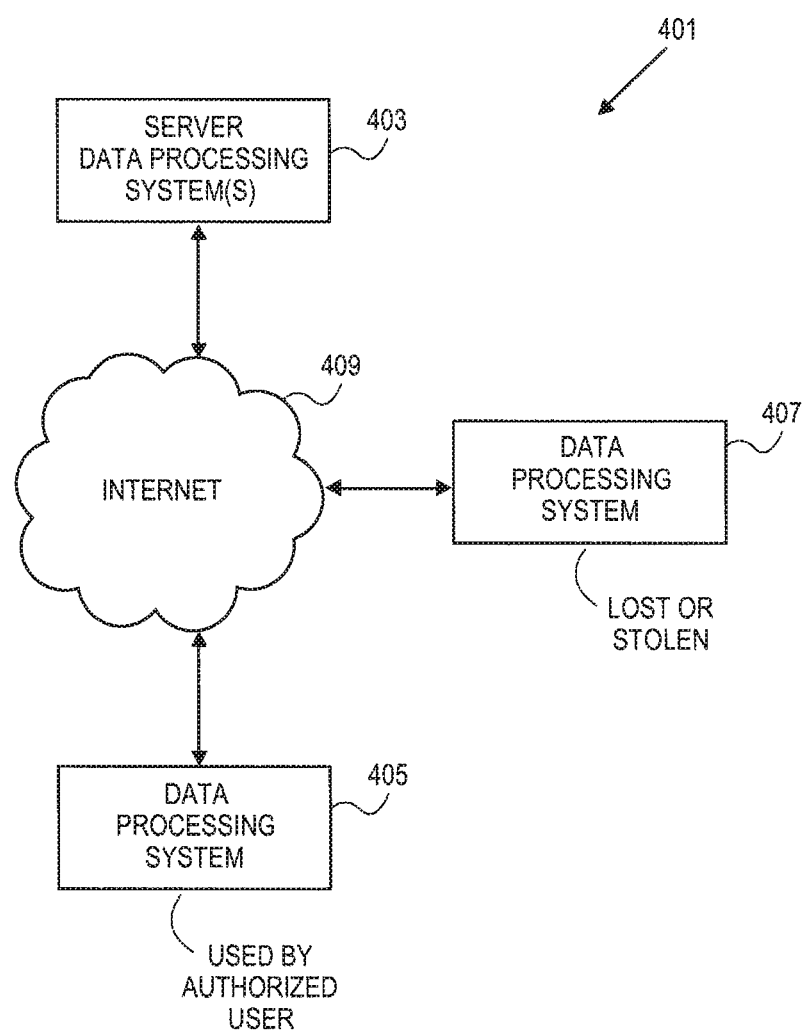
FIG. 4 shows an example of a plurality of data processing systems which may be connected together through a network, such as the Internet, to perform one or more of the methods described herein.

The example of how an authorized user can recover or protect a lost or stolen system is provided in conjunction with FIG. 4. In the system 401 shown in FIG. 4, an authorized user can use a system 405 to communicate through a network, such as the Internet 409, either directly or indirectly with the lost or stolen system 407. The lost or stolen system 407 has an enabled network access set up in the guest account on the system 407 which allows the system 407 to receive messages from either the data processing system 405 or the server system 403 and to transmit data to one or both of the systems 403 and 405. The server system 403 may be provided by a service provider or the company which sold system 407 to the authorized user who is now using system 405 while system 407 is lost or stolen. The authorized user can use system 405 to send a message to server 403 notifying the server 403 that the authorized user's system 407 has been lost or stolen. In turn, the server system 403 can send a push notification or other notification to the system 407 which is received by the daemon 229 on the system which is lost or stolen. In response to the receipt of this notification by daemon 229, the daemon can perform the one or more actions, such as the one or more actions referred to in operation 107 and described herein.

Figure 5:
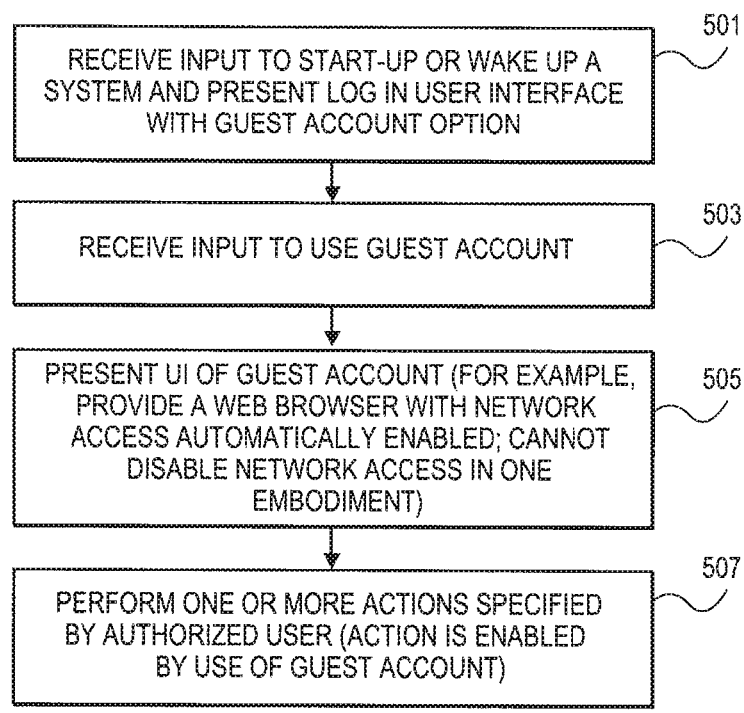
FIG. 5 is a flowchart which shows a method according to an embodiment of the present invention.

FIG. 5 shows an example of another method according to an embodiment of the present invention. In this method, the lost or stolen data processing system can perform the operations without receiving any signal from a server or other system. For example, the lost or stolen system can perform the one or more actions automatically in response to activation or use of the guest account. In this embodiment, the system can receive an input to start up or wake up in operation 501, and in response to this input, the system can present a log in user interface with a guest account option (such as the user interfaces shown in FIG. 3A or 3B). A user can then select the guest account option which causes the system, in operation 503, to receive the input to use the guest account, and in response to that input, the system can present a user interface, in operation 505, for the guest account. In one embodiment, the guest account can provide a web browser with network access which is automatically enabled as described elsewhere in this disclosure. In one embodiment, the network access cannot be disabled by the user of the guest account in order to guarantee that the lost or stolen system can communicate with another system through a network, such as the Internet. The user interface of the guest account can include other application software, such as PDF viewers, text editors, photo editors, email programs, etc. as described in this application. In operation 507, the lost or stolen system can then perform one or more actions specified by an authorized user, and these actions are enabled by the use of the guest account and are triggered by the use of the guest account in one embodiment of the method shown in FIG. 5. These one or more actions can be any one or a combination of actions described herein, including, for example, determining information which indicates a location of the data processing system and transmitting that information to the authorized user, or erasing data on a data storage device of the data processing system, or displaying a message which requests that the data processing system be returned to the authorized user, or capturing an image of the user of the data processing system while the guest account is being used, or locking the user of the guest account from logging into a user account of the authorized user, etc. The guest account can, in one embodiment of FIG. 5, be the guest account shown in FIG. 2 or can be the restricted guest account shown in FIG. 6, which is described further below. Moreover, this restricted guest account can be on a partition on the data storage device which is separate from the main partition for the one or more authorized user accounts of the data processing system. While the method shown in FIG. 5 does not require a signal from another system such as a server, such signal could still be used to cause additional actions to be performed in response to a signal from a server or from a system controlled by an authorized user of the lost or stolen system.

FIG. 6 shows an example of a multiple partition storage device which can be used in at least some of the embodiments of the present invention. Memory 601 can represent a magnetic hard drive, or a flash memory, or other non-volatile storage device or a volatile memory such as DRAM or a combination of volatile and non-volatile memory. In one implementation, memory 601 is a magnetic hard drive or a flash memory which is partitioned into distinct volumes, each represented by a partition. Main partition 603 includes an operating system (OS) 607 and a daemon 609 and data for one or more authorized user accounts 611 and also includes one or more user applications, such as a web browser, PDF viewer, photo viewer, photo editor, email applications, text editing applications, number editing applications (e.g. spreadsheets), presentation preparation applications (e.g. Keynote), etc. Operating system 607 may be a full version of the operating system deployed on the data processing system while a recovery operating system 621 may be a limited or reduced size operating system which does not include all of the installation packages normally associated with a full operating system; for example, the recovery operating system may not include printer drivers and other accessory software but can include the capability of downloading printer drivers, etc. and other accessory software when in a recovery or repair mode. Daemon 609, like daemon 625, can be computer software which is configured to operate in one or more of the methods described herein to protect or recover the system by allowing communication with an external system such as the server 403 or another data processing system, such as a data processing system operated by an authorized user, such as the system 405 shown in FIG. 4. The data for the authorized user accounts 611 can include user names, passwords, and other information commonly associated with the types of data stored for a user account. For example, this data 611 can include, for each authorized user, a user name, a user log in password, a screen log in password, a data encryption password, and other data setting or configuring the system for a particular authorized user as is known in the art. Such data can be maintained for each authorized user and the system may have multiple authorized users rather than just a single authorized user. Main partition 603 can include a security measure 615 which can be one or both of encryption or a lock on logging in for any authorized user account. In one embodiment, the security measure can be a full disk encryption or an encryption of a portion of the data stored in main partition 603. In another embodiment, security measure 615 can be a lock on a log in for any authorized user account; this lock can be implemented as described below in conjunction with operation 809 of FIG. 8, and can require that a new recovery password be entered into the system in order to cause the system to exit from the guest account mode as described further below. In this case, the lock implemented through security measure 615 can require a recovery mode password or a recovery password to be entered into the system to allow it to exit the guest account and allow the use of the one or more authorized user accounts on the system.

Figure 10:
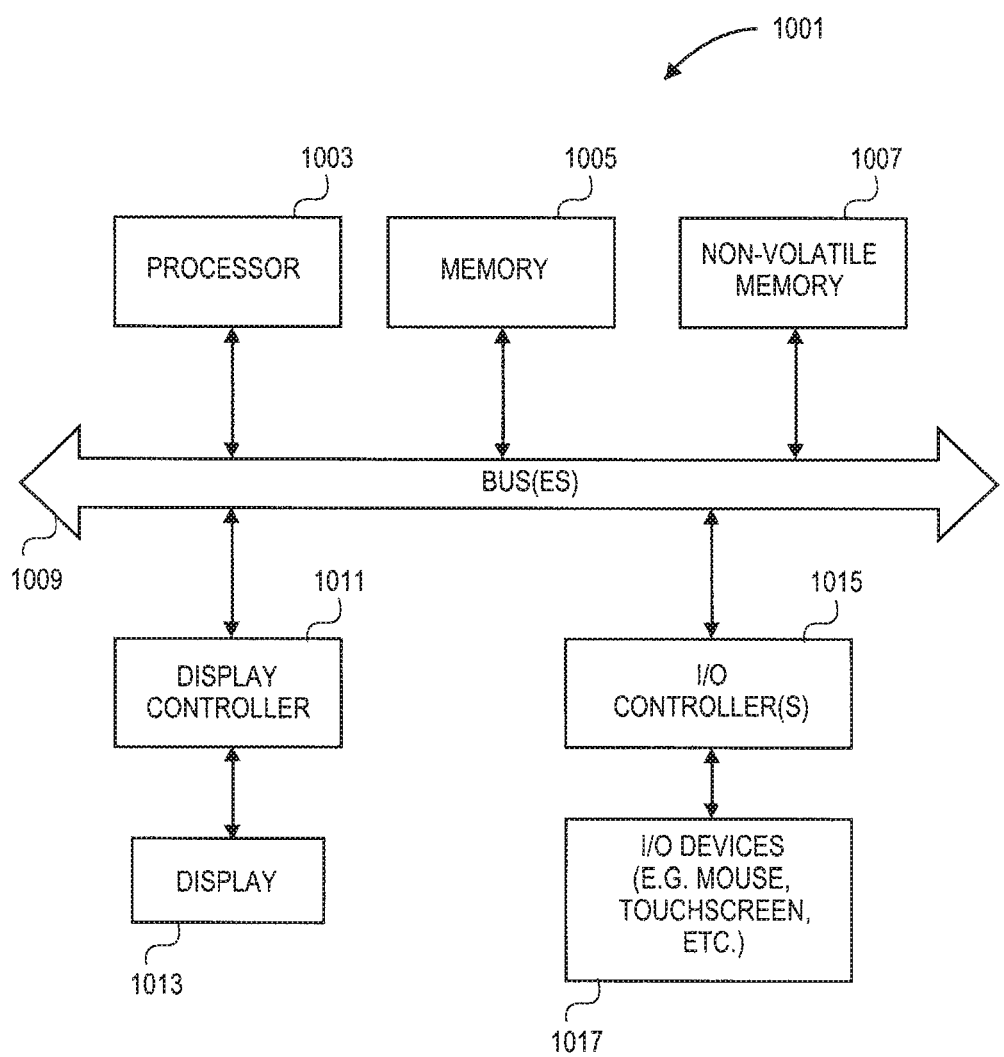
FIG. 10 shows an example of a data processing system which may be used with any of the embodiments described herein.

Recovery partition 605 can include a recovery operating system 621, described above, as well as disk repair software, and an OS reinstall software, and a data restore software. This is shown as component 623 and all of these elements within component 623 may be provided or a subset of these elements may be provided. The disk repair software allows the system to boot off of the recovery partition through the recovery OS 621 and then attempt to repair the disk or other storage device by performing conventional disk repair or storage device repair mechanisms (e.g. performing a disk utility operation or running the "FSCK" command, etc.). The operating system reinstall element in component 623 can include the ability to reinstall the operating system on the main partition 603 by, for example, reinstalling the operating system through a network connection, etc. The data restore element in component 623 can include the ability to restore a user's data and applications through a previously performed backup operation as is known in the art. Also within the recovery partition 605 is daemon software 625 which, like daemon 609, allows the data processing system shown in FIG. 6, which can be the lost or stolen system, to communicate with one or more other systems, such as the server 403 shown in FIG. 4 or the system 405 shown in FIG. 4, etc. The communication can include the receipt of a push notification or other messages from the server or other system and it can include transmitting messages to other systems, such as transmitting the location of the lost or stolen system to another system, such as the server 403 or a system 405 used by an authorized user who is attempting to recover the lost or stolen system. These notifications or messages or other data can be transmitted through network interface 635 of the system shown in FIG. 6 which is coupled to one or more networks 637 which can be the Internet. Network interface 635 is also coupled to a processing system 633 which in turn is coupled to memory 601. Processing system 633 can be one or more microprocessors each with one or more cores as is well known in the art. FIG. 10 shows an example of a data processing system which includes one or more processors along with memory, including a non-volatile memory 1007 which can be memory 601 in one embodiment.

Recovery partition 605 can also include a web browser 627 which can be the same as the web browser which is part of user applications 613, although because it is stored on a separate partition, it is a separate copy of that web browser if it is the same type of web browser. The recovery partition 605 can also, in one embodiment, include other software applications, such as PDF viewer, an email program, and other software applications described in conjunction with user applications 613. Recovery partition 605 also includes data for a guest account 629. This data can include some of the same types of data that a normal authorized user account can have, such as a user account name and configuration data for configuring the guest account. The system shown in FIG. 6 is an example of how a lost or stolen system can be protected according to one embodiment, and this system may be used with any one of the methods described herein, including the methods shown in FIGS. 1, 5, 7, 8, and 9.

Figure 7:
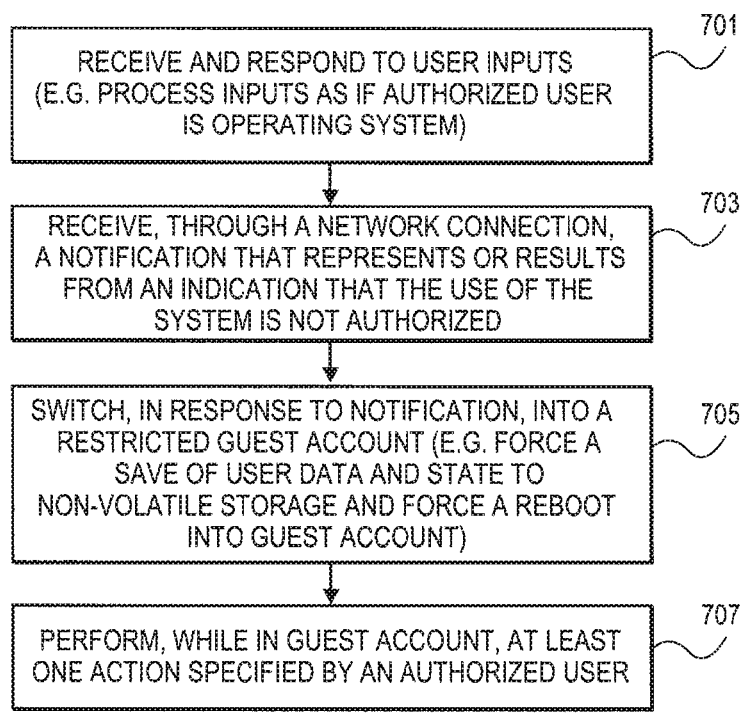
FIG. 7 is a flowchart which illustrates another method according to an embodiment of the present invention.

FIG. 7 shows an example of a method according to one embodiment of the invention which includes a switch into a restricted guest account in response to a notification, such as a notification received by daemon 229 or a notification received by daemon 609. This method can be performed when a data processing system has no log in password or auto log in has been set up on the system and there is no screen lock set up on the system which requires a password to be entered after the system has gone to sleep. In this case, a thief can find the data processing system and begin to use it as if the thief is the authorized user because no passwords are required to be entered in order to gain access to the system. Hence, in operation 701, the system receives and responds to user inputs as if an authorized user is operating the system, even if the system is lost or stolen. In operation 703, the system can receive, through a network connection (e.g. network interface 207 or network interface 635), a notification, such as a push notification, that represents or results from an indication that the use of the system is not authorized. In one embodiment, this indication can originate from one or more of the authorized users of the lost or stolen system who have sent a message to server 403 which in turn causes the transmission of a push notification to the lost or stolen system which is received in operation 703. In response to the notification from operation 703, the system automatically switches into a restricted guest account. This can, in one implementation, be in the form of a fast user switching operation without rebooting the system. In another implementation, the switching can include a rebooting of the system into a guest account, and in yet another implementation, the switching can include rebooting the system into a guest account executed from a recovery partition or other partition which is separate from a partition from which the authorized user account executes. In one embodiment, prior to rebooting the system, if rebooting is used, the system can force a saving of all user data and the user state (e.g. state of each open application and its windows, etc.) into a non-volatile storage in a manner which is similar to a hibernation entry operation or sleep entry operation in which all user data in DRAM is saved to a non-volatile storage along with the state of the system (e.g. all of its open windows, the positions of the windows, etc.) as is known in the art. In this way, the system can save user data that has not been saved to a hard drive and can save the state information of the system to allow the authorized user to resume use of the system from the point at which it was lost or stolen. The saving of user data and system state in this manner can be performed before forcing a reboot into the guest account. The guest account can, as with other embodiments described herein, allow the use of a web browser and provide access to the Internet. In one embodiment, the user of the guest account cannot disable network access and hence the system can always be guaranteed access to the Internet to the extent it is available (e.g. to the extent that a WiFi hotspot is available or a cellular telephone connection is available, etc.).

In operation 707, the lost or stolen system can perform, while in the guest account, at least one action specified by an authorized user. This action may be specified before the system is lost or stolen (e.g. the authorized user enters a preference indicating those actions, which preference is saved on the system and retrieved when the guest account is used) or the actions can be specified remotely by the authorized user in the context of a system shown, for example, in FIG. 4 in which an authorized user instructs the lost or stolen system, either directly or indirectly, of the actions required. The actions can be any one of determining information that indicates a location of the data processing system and transmitting that information to the authorized user, or erasing data on a data storage device of the data processing system, or displaying a message which requests that the data processing system be returned to the authorized user; or capturing an image of the user of the data processing system, or locking the user from logging into a user account of the authorized system, or any combination of two or more of these actions.

The method shown in FIG. 7 may be employed with a system such as that shown in FIG. 6 or with a system such as that shown in FIG. 2. If the system of FIG. 6 is used, then the authorized user's account can be executed through a first operating system stored on a first partition on a non-volatile storage device and the restricted guest account is executed through a second operating system stored on a second partition on the non-volatile storage device. In this configuration, the files of the authorized user or users are not accessible to the user of the restricted guest account as the first partition can be hidden from the user of the restricted guest account. In one embodiment, the second partition can include recovery software as shown and described relative to FIG. 6, such as any one of the elements of components 623.

Figure 8:
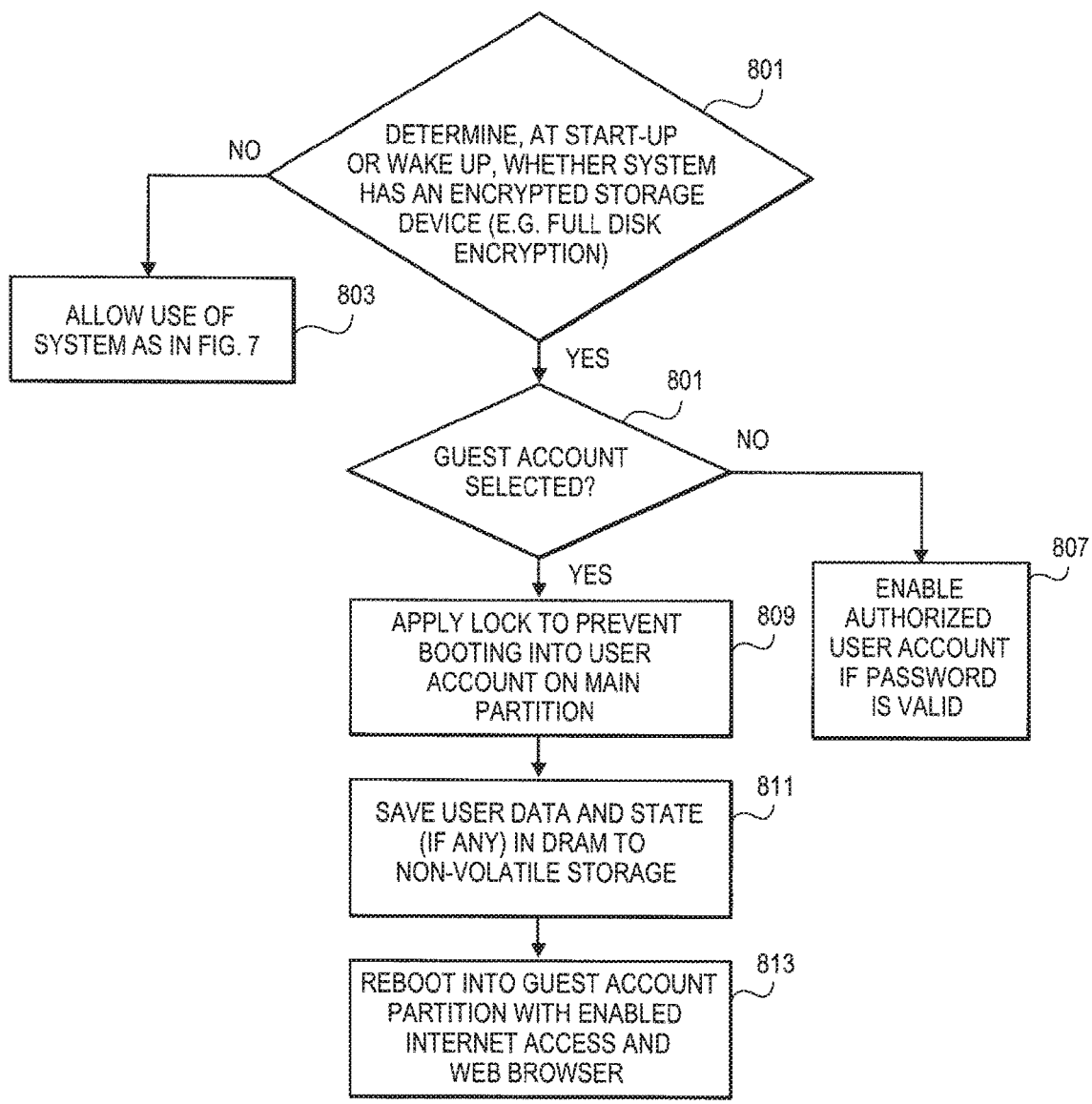
FIG. 8 is another flowchart which shows another method according to an embodiment of the present invention.

FIG. 8 shows an example of another method according to one embodiment of the present invention. The method shown in FIG. 8 can be performed with the system shown in FIG. 6 when a main partition includes a security measure in which data has been encrypted, such as an encrypted storage device which employs a full disk encryption. In this method, the system, such as the system shown in FIG. 6, when implementing the method of FIG. 8, does not have to wait for a push notification in order to take action; rather, the use of a guest account can cause the system to take action immediately and in response to that use, reboot into a guest account partition and perform the one or more actions such as those actions described relative to operation 707 or operation 507 of FIGS. 7 and 5, respectively. These actions can be performed after rebooting into the guest account partition in operation 813. The method of FIG. 8 can begin in operation 801 in which the system determines, at start up or wake up, whether the system has an encrypted storage device, such as a hard disk or a flash memory that has some level of disk encryption, such as a full disk encryption or full flash memory encryption. If the system does not have such an encrypted storage device, then the method proceeds to operation 803 in which the use of the system is allowed as shown in FIG. 7. In this case, the system can still switch into the guest account mode after receiving a notification, such as a push notification described herein. However, if operation 801 determines the system has an encrypted storage device, then the system determines next in operation 805 whether or not a guest account is selected. If it is not, the system proceeds to operation 807 in which the authorized user account is enabled if a valid authorized user password is entered in a password data entry field. On the other hand, if a guest account is selected, then, in operation 809, the system can apply a lock to prevent booting into the user account on the main partition and can save, in operation 811, user data and state information, if any, in DRAM to a non-volatile storage device. Operation 811 is similar to the operations which occur when a system hibernates or goes to sleep and before doing so, unsaved user data and the state of applications and the processing system is all saved to non-volatile storage so that the authorized user can return to the state of the system (e.g., which applications are launched and open, which windows are open, the position of the windows, etc.) when the user recovers the lost or stolen system. Then in operation 813, the system reboots into the guest account which can be on a separate partition which includes a web browser and which includes an automatically enabled network access which permits use of the web browser to browse the Internet. Also, as noted in FIG. 6, additional software may be provided for the guest account so that the guest account appears to be a relatively normal user account allowing use of the web browser and other common software applications in the guest account.

The lock which is applied in operation 809 can, in one embodiment, require the entry of a previously stored recovery password (stored prior to the system becoming lost or stolen) which can be different than the normal log in password used by the authorized user. Alternatively, this recovery password can be created by the authorized user when the authorized user instructs a server, such as a push notification server, to take certain actions with respect to a lost or stolen system. For example, the user of the system 405 shown in FIG. 4 can provide a recovery password to the server 403 which can then provide that recovery password to the lost or stolen system when that system is in communication with the server through, for example, the Internet.

Figure 9:
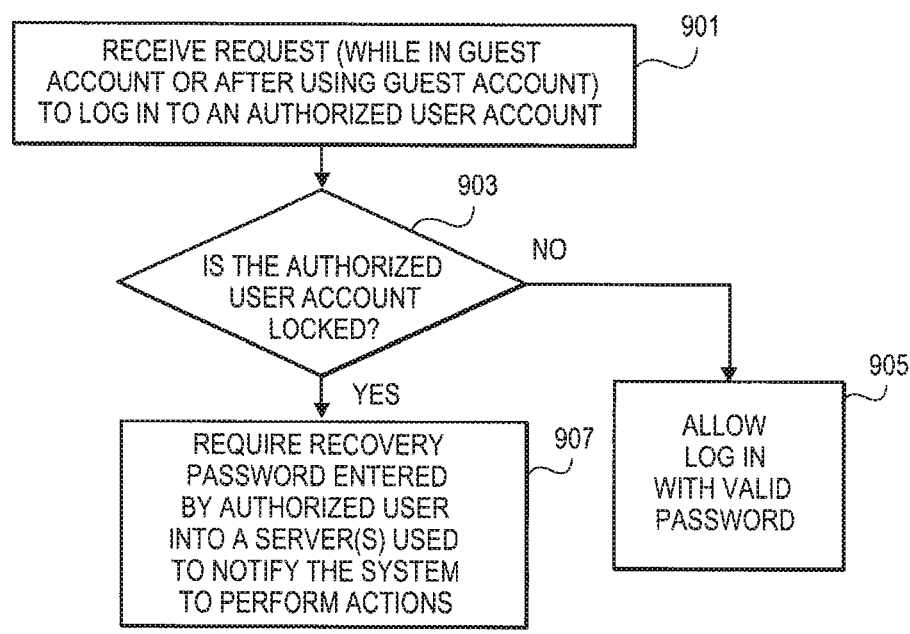
FIG. 9 is another flowchart which shows another method according to an embodiment of the present invention.

FIG. 9 shows an example of how a recovery password can be used when an authorized user account is locked. It will be appreciated that in one embodiment all authorized user accounts are locked in response to operation 809 rather than a selected group of authorized user accounts. The method of FIG. 9 can be performed after the guest account has been activated or is in use. In operation 901, the guest account receives a request to log in as an authorized user. The system, in operation 903, determines whether the authorized user account is locked; this lock can be the result of operation 809 which is described herein or could be the result of an optional operation in the method of FIG. 7, etc. If the authorized user account is not locked, then processing proceeds to operation 905 in which a normal log in is allowed with the previously stored password of the particular authorized user. If the password which is entered is valid, then use of the authorized user account is allowed as in operation 905. On the other hand, if it is determined that the authorized user account is locked in operation 903, then processing proceeds to operation 907 in which the system requires a recovery password to be entered into a password data entry field in order to gain access to a particular authorized user account. In one embodiment, this recovery password can be created by an authorized user after the system is lost or stolen. The authorized user can, using the system 405 shown in FIG. 4, for example, create this recovery password and transmit that recovery password either directly to system 407, which is the lost or stolen system, or indirectly to that system through the server system 403 as shown in FIG. 4. Alternatively, the recovery password could previously have been stored on the system prior to being lost or stolen and the authorized user can merely remember and use that recovery password after recovering the lost or stolen system.

Any one of the methods described herein can be implemented on a variety of different data processing devices, including general purpose computer systems, special purpose computer systems, etc. For example, the data processing systems which may use any one of the methods described herein may include a desktop computer or a laptop computer or a tablet computer or a smart phone, or a cellular telephone, or a personal digital assistant (PDA), an embedded electronic device or a consumer electronic device. FIG. 10 shows one example of a typical data processing system which may be used with the present invention. Note that while FIG. 10 illustrates the various components of a data processing system, such as a computer system, it is not intended to represent any particular architecture or manner of interconnecting the components as such details are not germane to the present invention. It will also be appreciated that other types of data processing systems which have fewer components than shown or more components than shown in FIG. 10 may also be used with the present invention. The data processing system of FIG. 10 may be a Macintosh computer or iPad or iPod Touch from Apple Inc. of Cupertino, Calif. As shown in FIG. 10, the data processing system 1001 includes one or more buses 1009 which serve to interconnect the various components of the system. One or more processors 1003 are coupled to the one or more buses 1009 as is known in the art. Memory 1005 may be DRAM or non-volatile RAM or may be flash memory or other types of tangible memory or a combination of such memories. This memory is coupled to the one or more buses 1009 using techniques known in the art. The data processing system 1001 can also include non-volatile memory 1007 which may be a hard disk drive or a flash memory or a magnetic optical drive or magnetic memory or an optical drive or other types of memory systems which maintain data even after power is removed from the system. The non-volatile memory 1007 and the memory 1005 are both coupled to the one or more buses 1009 using known interfaces and connection techniques. A display controller 1011 is coupled to the one or more buses 1009 in order to receive display data to be displayed on a display device 1013 which can display any one of the user interface features or embodiments described herein. The display device 1013 can include an integrated touch input to provide a touch screen. The data processing system 1001 can also include one or more input/output (I/O) controllers 1015 which provide interfaces for one or more I/O devices, such as one or more mice, touch screens, touch pads, joysticks, and other input devices including those known in the art and output devices (e.g. speakers). The input/output devices 1017 are coupled through one or more I/O controllers 1015 as is known in the art. While FIG. 10 shows that the non-volatile memory 1007 and the memory 1005 are coupled to the one or more buses directly rather than through a network interface, it will be appreciated that the data processing system may utilize a non-volatile memory which is remote from the system, such as a network storage device which is coupled to the data processing system through a network interface such as a modem or Ethernet interface or wireless interface, such as a wireless WiFi transceiver or a wireless cellular telephone transceiver or a combination of such transceivers. As is known in the art, the one or more buses 1009 may include one or more bridges or controllers or adapters to interconnect between various buses. In one embodiment, the I/O controller 1015 includes a USB adapter for controlling USB peripherals and can include I/O controllers that can control an Ethernet port or a wireless transceiver or combination of wireless transceivers. It will be apparent from this description that aspects of the present invention may be embodied, at least in part, in software. That is, the techniques and methods described herein may be carried out in a data processing system in response to its processor(s) executing a sequence of instructions contained in a memory, such as the memory 1005 or the non-volatile memory 1007 or a combination of such memories and each of these memories is a form of a machine readable, tangible storage medium. In various embodiments, hardwired circuitry may be used in combination with software instructions to implement the present invention. Thus the techniques are not limited to any specific combination of hardware circuitry and software nor to any particular source for the instructions executed by the data processing system.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method for protecting or recovering a computing device, the method comprising, at the computing device:

receiving a first request to login to a guest account that is different from a user account managed on the computing device;

establishing a session for the guest account in response to receiving the first request, wherein an initial configuration of the computing device locks the user account and requires first login credentials to deactivate the session for the guest account and to unlock the user account;

establishing a communications link with a network through the session for the guest account, wherein a different computing device is communicably coupled to the computing device through the communications link;

in response to establishing the communications link, updating the initial configuration of the computing device to a second configuration of the computing device that requires:

(i) the communications link to remain active while the session for the guest account is active, and (ii) second login credentials to be provided to deactivate the session for the guest account and to unlock the user account;

receiving, over the communications link from the different computing device, a second request to perform an action including locking an unauthorized user from logging into the user account at the computing device; and performing the action in response to receiving the second request.

2. The method of claim 1, wherein an authorized user of the computing device selects the action, and the action includes at least one of:

(a) determining information that indicates a location of the computing device and transmitting the information to the authorized user at the different computing device;

(b) erasing data on a data storage device of the computing device;

(c) displaying a message that requests that the computing device be returned to the authorized user; and (d) capturing an image of the unauthorized user who is operating the computing device.

3. The method of claim 2, wherein:

when the action includes (a) determining information that indicates the location, the computing device:

determines the information from one of a network connection or a satellite positioning system or a cellular wireless radio connection, and transmits the information to the authorized user at the different computing device; and when the action includes capturing the image of the unauthorized user, the computing device:

captures the image through a camera coupled to the computing device and transmits the image to the authorized user at the different computing device.

4. The method of claim 2, wherein:

the user account is executed through a first operating system (OS) stored on a first partition on the data storage device, the guest account is executed through a second OS stored on a second partition on the data storage device, and data files associated with the user account are not accessible through the guest account.

5. The method of claim 4, wherein the second partition comprises recovery software configured to perform at least one of:

(i) repairing the first partition of the data storage device;

(ii) reinstalling the first OS on the first partition; and (iii) restoring the data files associated with the user account from a backup of the data files.

6. The method of claim 1, further comprising:

receiving a third request to login to the user account using the second login credentials; and deactivating the session for the guest account and activating a second session of the user account.

7. The method of claim 1, wherein, prior to receiving the second request to perform the action, the method further comprises:

receiving, through the communications link, a notification that the computing device is lost or stolen.

8. A non-transitory computer readable storage medium configured to store instructions that, when executed by a processor coupled to a computing device, cause the computing device to protect or recover the computing device, by causing the computing device to:

receive a first request to login to a guest account that is different from a user account managed on the computing device;

establish a session for the guest account in response to receiving the first request, wherein an initial configuration of the computing device locks the user account and requires first login credentials to deactivate the session for the guest account and to unlock the user account;

establish a communications link with a network through the session for the guest account, wherein a different computing device is communicably coupled to the computing device through the communications link;

in response to establishing the communications link, update the initial configuration of the computing device to a second configuration of the computing device that requires:

(i) the communications link to remain active while the session for the guest account is active, and (ii) second login credentials to be provided to deactivate the session for the guest account and to unlock the user account;

receive, over the communications link from the different computing device, a second request to perform an action including locking an unauthorized user from logging into the user account at the computing device; and perform the action in response to receiving the second request.

9. The non-transitory computer readable storage medium of claim 8, wherein an authorized user of the computing device selects the action, and the action includes at least one of:

(a) determining information that indicates a location of the computing device and transmitting the information to the authorized user at the different computing device;

(b) erasing data on a data storage device of the computing device;

(c) displaying a message that requests that the computing device be returned to the authorized user; and (d) capturing an image of the unauthorized user who is operating the computing device.

10. The non-transitory computer readable storage medium of claim 9, wherein:

when the action includes (a) determining information that indicates the location, the computing device:

determines the information from one of a network connection or a satellite positioning system or a cellular wireless radio connection, and transmits the information to the authorized user at the different computing device; and when the action includes capturing the image of the unauthorized user, the computing device:
captures the image through a camera coupled to the computing device and transmits the image to the authorized user at the different computing device.

11. The non-transitory computer readable storage medium of claim 9, wherein:
the user account is executed through a first operating system (OS) stored on a first partition on the data storage device,
the guest account is executed through a second OS stored on a second partition on the data storage device, and
data files associated with the user account are not accessible through the guest account.

12. The non-transitory computer readable storage medium of claim 11, wherein the second partition comprises recovery software configured to perform at least one of:
(i) repairing the first partition of the data storage device;
(ii) reinstalling the first OS on the first partition; and
(iii) restoring the data files associated with the user account from a backup of the data files.

13. The non-transitory computer readable storage medium of claim 8, wherein the instructions further cause the computing device to:
receive a third request to login to the user account using the second login credentials; and
deactivate the session for the guest account and activate a second session of the user account.

14. The non-transitory computer readable storage medium of claim 8, wherein the instructions further cause the computing device to, prior to receiving the second request to perform the action:
receive, through the communications link, a notification that the computing device is lost or stolen.

15. A computing device configured to protect or recover the computing device, the computing device comprising:
a hardware processor configured to cause the computing device to:
receive a first request to login to a guest account that is different from a user account managed on the computing device;
establish a session for the guest account in response to receiving the first request, wherein an initial configuration of the computing device locks the user account and requires first login credentials to deactivate the session for the guest account and to unlock the user account;
establish a communications link with a network through the session for the guest account, wherein a different computing device is communicably coupled to the computing device through the communications link;
in response to establishing the communications link, update the initial configuration of the computing device to a second configuration of the computing device that requires:
(i) the communications link to remain active while the session for the guest account is active, and
(ii) second login credentials to be provided to deactivate the session for the guest account and to unlock the user account;
receive, over the communications link from the different computing device, a second request to perform an action including locking an unauthorized user from logging into the user account at the computing device; and
performing the action in response to receiving the second request.

16. The computing device of claim 15, wherein an authorized user selects the action, and the action includes at least one of:
(a) determining information that indicates a location of the computing device and transmitting the information to the authorized user at the different computing device;
(b) erasing data on a data storage device of the computing device;
(c) displaying a message that requests that the computing device be returned to the authorized user; and
(d) capturing an image of the unauthorized user who is operating the computing device.

17. The computing device of claim 16, wherein:
when the action includes (a) determining information that indicates the location, the computing device:
determines the information from one of a network connection or a satellite positioning system or a cellular wireless radio connection, and transmits the information to the authorized user at the different computing device; and
when the action includes capturing the image of the unauthorized user, the computing device:
captures the image through a camera coupled to the computing device and transmits the image to the authorized user at the different computing device.

18. The computing device of claim 16, wherein:
the user account is executed through a first operating system (OS) stored on a first partition on the data storage device,
the guest account is executed through a second OS stored on a second partition on the data storage device, and
data files associated with the user account are not accessible through the guest account.

19. The computing device of claim 18, wherein the second partition comprises recovery software configured to perform at least one of:
(i) repairing the first partition of the data storage device;
(ii) reinstalling the first OS on the first partition; and
(iii) restoring the data files associated with the user account from a backup of the data files.

20. The computing device of claim 15, wherein the hardware processor is configured to further cause the computing device to, prior to receiving the second request to perform the action:
receive, through the communications link, a notification that the computing device is lost or stolen.

* * * * *